United States Patent
Sigler et al.

(10) Patent No.: US 10,682,723 B2
(45) Date of Patent: Jun. 16, 2020

(54) RESISTANCE SPOT WELDING STEEL AND ALUMINUM WORKPIECES WITH ELECTRODE HAVING INSERT

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); James G. Schroth, Troy, MI (US); David S. Yang, Shanghai (CN); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 693 days.

(21) Appl. No.: 15/097,821

(22) Filed: Apr. 13, 2016

(65) Prior Publication Data

US 2017/0297135 A1    Oct. 19, 2017

(51) Int. Cl.
  *B23K 11/20*    (2006.01)
  *B23K 11/11*    (2006.01)
  *B23K 11/30*    (2006.01)
  *B23K 103/20*   (2006.01)

(52) U.S. Cl.
  CPC ........... *B23K 11/20* (2013.01); *B23K 11/115* (2013.01); *B23K 11/3009* (2013.01); *B23K 2103/20* (2018.08)

(58) Field of Classification Search
  CPC ....... B23K 11/11; B23K 11/115; B23K 11/20; B23K 11/3009; B23K 11/14; B23K 11/18; B23K 11/185; B23K 11/3018; B23K 2103/20

USPC .................... 219/91.2, 92–94, 118, 119, 120
See application file for complete search history.

(56) References Cited

U.S. PATENT DOCUMENTS

| | | | |
|---|---|---|---|
| 2013/0189023 A1* | 7/2013 | Spinella ............. | B23K 11/0026 403/270 |
| 2016/0016252 A1* | 1/2016 | Edwards, II .......... | B23K 11/115 219/91.1 |

FOREIGN PATENT DOCUMENTS

| | | |
|---|---|---|
| CN | 105234544 A | 1/2016 |
| CN | 105312755 A | 2/2016 |

OTHER PUBLICATIONS

Chinese to English machine translation of CN 105234544.*
(Continued)

*Primary Examiner* — Michael G Hoang
(74) *Attorney, Agent, or Firm* — Reising Ethington P.C.

(57) ABSTRACT

A method of resistance spot welding a steel workpiece and an aluminum or aluminum alloy workpiece, and a welding electrode used therein. In one step of the method a workpiece stack-up is provided. The workpiece stack-up includes a steel workpiece and an aluminum or aluminum alloy workpiece. Another step of the method involves contacting the aluminum or aluminum alloy workpiece with a weld face of the welding electrode. The welding electrode has a body and an insert. The insert is composed of a material having an electrical resistivity that is greater than an electrical resistivity of the material of the body. The weld face has a first section defined by a surface of the insert and has a second section defined by a surface of the body. Both the first and second sections make surface-to-surface contact with the aluminum or aluminum alloy workpiece amid resistance spot welding.

17 Claims, 4 Drawing Sheets

(56) References Cited

OTHER PUBLICATIONS

U.S. Appl. No. 14/561,746, Wang et al., "Resistance Spot Welding Steel and Aluminum Workpieces with Electrode Insert," filed Dec. 5, 2014.

U.S. Appl. No. 15/074,690, Sigler et al., "Resistive Welding Electrode and Method for Spot Welding Steel and Aluminum Alloy Workpieces with the Resistive Spot Welding Electrode," filed Mar. 18, 2016.

* cited by examiner

RESISTANCE SPOT WELDING STEEL AND ALUMINUM WORKPIECES WITH ELECTRODE HAVING INSERT

TECHNICAL FIELD

The technical field of this disclosure relates generally to resistance spot welding and, more particularly, to resistance spot welding a steel workpiece and an aluminum or aluminum alloy workpiece.

BACKGROUND

Resistance spot welding is a process used in a number of industries to join together two or more metal workpieces. The automotive industry, for instance, often uses resistance spot welding to join together pre-fabricated metal workpieces during the manufacture of a vehicle door, hood, trunk lid, or lift gate, among other vehicle components. Multiple resistance spot welds are typically made along a periphery of the metal workpieces or at some other location. While spot welding has typically been performed to join together certain similarly-composed metal layers—such as steel-to-steel and aluminum alloy-to-aluminum alloy—the desire to incorporate lighter weight materials into a vehicle platform has created interest in joining steel workpieces to aluminum or aluminum alloy (hereafter collectively "aluminum" for brevity) workpieces by resistance spot welding. Moreover, the ability to resistance spot weld workpiece stack-ups containing different workpiece combinations (e.g., aluminum/aluminum, steel/steel, and aluminum/steel) with one piece of equipment would increase production flexibility and reduce manufacturing costs since many vehicle assembly plants already have spot welding infrastructures in place. The desire to resistance spot weld dissimilar metal workpieces is not unique to the automotive industry; it is present in other industries such as aerospace, marine, railway, building construction, and industrial equipment applications, among others.

Resistance spot welding, in general, relies on the resistance to the flow of electric current through contacting metal workpieces and across their faying interface to generate heat. To carry out a resistance spot welding process, a pair of opposed welding electrodes is clamped at aligned spots on opposite sides of the metal workpieces at a weld site. An electrical current is then passed through the workpieces from one welding electrode to the other. Resistance to the flow of the electric current generates heat within the metal workpieces and at their faying interface. When the workpieces being spot welded are a steel workpiece and an aluminum workpiece, the heat generated at the faying interface typically initiates a molten weld pool that penetrates into the aluminum workpieces from the faying interface. The molten weld pool wets the adjacent surface of the steel workpiece and, upon cessation of the current flow, solidifies into a weld nugget that forms all or part of a weld joint. After the spot welding process is completed, the welding electrodes are retracted from the workpiece surfaces and the spot welding process is repeated at another weld site.

Resistance spot welding a steel and an aluminum workpiece, however, can be challenging since the two metals possess different properties that tend to complicate the welding process. Specifically, steel has a relatively high melting point (~1500° C.) and relatively high electrical and thermal resistivities, while aluminum has a relatively low melting point (~600° C.) and relatively low electrical and thermal resistivities. As a result, most of the heat is generated in the steel workpiece during electrical current flow. This heat imbalance sets up a temperature gradient between the steel workpiece (higher temperature) and the aluminum workpiece (lower temperature) that initiates rapid melting of the aluminum workpiece. The combination of the temperature gradient created during current flow and the high thermal conductivity of the aluminum workpiece means that, immediately after the electrical current has ceased, a situation occurs where heat is not disseminated symmetrically from the weld site. Instead, heat is conducted from the hotter steel workpiece through the aluminum workpiece towards the welding electrode in contact with the aluminum workpiece, creating relatively steep thermal gradients in that direction.

The development of a steep thermal gradient between the steel workpiece and the welding electrode in contact with the aluminum workpiece is believed to weaken the integrity of the resultant weld joint in two primary ways. First, because the steel workpiece retains heat for a longer duration than the aluminum workpiece after the electrical current has ceased, the molten weld pool that has been initiated and grown in the aluminum workpiece solidifies directionally, starting from the region nearest the colder welding electrode (often water cooled) associated with the aluminum workpiece and propagating towards the faying interface. A solidification front of this kind tends to sweep or drive defects—such as gas porosity, shrinkage voids, micro-cracking, and oxide residue—towards and along the faying interface within the aluminum weld nugget. Second, a sustained elevated temperature in the steel workpiece promotes the growth of brittle Fe—Al intermetallic compounds at and along the faying interface. The intermetallic compounds tend to form thin reaction layers between the aluminum weld nugget and the steel workpiece. If present, these intermetallic layers are generally considered part of the weld joint along with the weld nugget. Having a dispersion of weld nugget defects together with excessive growth of Fe—Al intermetallic compounds along the faying interface is thought to reduce the peel strength of the final weld joint.

In light of the aforementioned challenges, previous efforts to spot weld a steel workpiece and an aluminum workpiece have employed a weld schedule that specifies higher currents, longer weld times, or both (as compared to spot welding steel-to-steel, for instance), in order to try and obtain a reasonable weld bond area. These efforts have been largely unsuccessful in a manufacturing setting and have a tendency to damage the welding electrodes. Given that previous spot welding efforts have not been particularly successful, mechanical fasteners such as self-piercing rivets and flow-drill screws have predominantly been used instead. The mechanical fasteners, however, take much longer to put in place and have high consumable costs compared to spot welding. They also add weight to the vehicle component—weight that is avoided when joining is accomplished by way of spot welding—that offsets some of the weight savings attained through the use of aluminum workpieces in the first place. Advancements in spot welding that would make the process more capable of joining steel and aluminum workpieces would hence be a welcome addition to the art.

SUMMARY OF THE DISCLOSURE

A method of resistance spot welding a workpiece stack-up that includes a steel workpiece and an aluminum or aluminum alloy workpiece (collectively referred to herein as "aluminum" for brevity) workpiece is disclosed, and a welding electrode employed in the method is also disclosed.

The method involves the use of an insert located within a body of the welding electrode. Use of the insert ultimately provides a weld joint that exhibits improved overall strength and durability, including improved peel strength. The improvements are believed to result from altered solidification behavior of a molten aluminum alloy weld pool. First, the insert is composed of a material having a relatively high electrical resistivity which, amid resistance spot welding, generates heat. The insert further retains heat within the aluminum workpiece that is in contact with the insert during resistance spot welding. Second, DC electrical current exchanged between welding electrodes—including the welding electrode with the insert—assumes a conical flow pattern in the workpiece stack-up due to the insert's relatively high electrical resistivity. The conical flow pattern has the effect of concentrating heat within a smaller zone in the steel workpiece compared to heat in the aluminum workpiece.

The generated, retained, and concentrated heat serve to change the temperature distribution at the molten aluminum alloy weld pool by creating three-dimensional radial temperature gradients therearound, or by enlarging already-existing three dimensional radial temperature gradients. These temperature gradients slow directional heat flow into the welding electrode with the insert and help promote lateral heat transfer. The resultant improved heat balance and more even heat distribution changes the cooling action of the molten aluminum alloy weld pool as it solidifies to become part of the weld joint.

To have a relatively high electrical resistivity, the insert can be composed of a refractory-based material having an electrical conductivity that is less than or equal to approximately 65% of the electrical conductivity of commercially pure annealed copper as defined by the International Annealed Copper Standard (IACS). For instance, the insert can be composed of a molybdenum metal, a molybdenum metal composite, a tungsten metal, or a tungsten metal composite. Furthermore, at a weld face of the welding electrode, a surface of the insert constitutes a section of the weld face that makes surface-to-surface contact with the aluminum workpiece. Likewise, a surface of the body constitutes another section of the weld face that makes surface-to-surface contact with the aluminum workpiece amid a resistance spot weld.

DETAILED DESCRIPTION

The methods and assemblies detailed in this description resolve several challenges encountered when resistance spot welding a workpiece stack-up that includes one or more aluminum workpieces and one or more steel workpieces. Though described in more detail below, in general, the methods and assemblies described can alter the solidification behavior of a molten aluminum weld pool created within the aluminum workpiece in order to limit or altogether preclude the accumulation and dissemination of defects at a faying interface between the steel and aluminum workpieces. The methods and assemblies can also minimize the size and thickness of any Fe—Al intermetallic layers formed at the faying interface. Taken together or alone, these measures help ensure adequate strength, in particular adequate peel strength, of a weld joint established between the aluminum and steel workpieces. And while the methods and assemblies are described below in the context of vehicle body parts, skilled artisans will know and understand that such methods and assemblies may be used in other contexts such as aerospace, marine, railway, building construction, and industrial equipment applications, among others.

Figure 1:
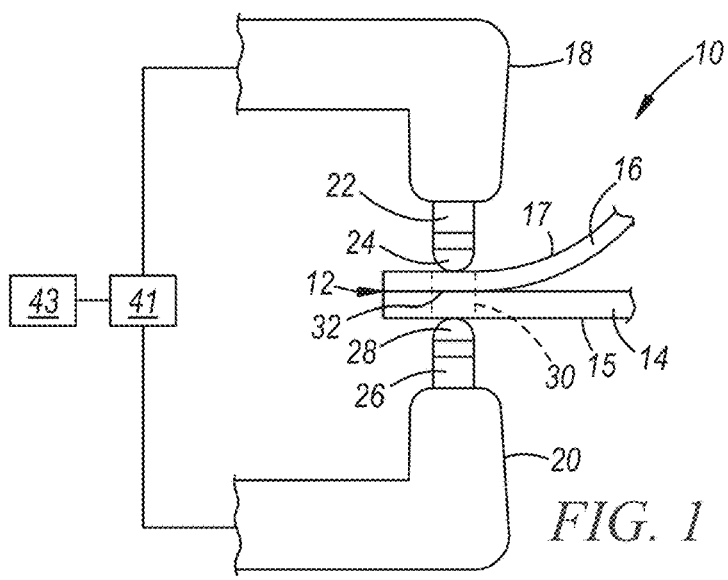
FIG. 1 is a side view of a resistance spot welding assembly.

FIG. 1 shows one example of a resistance spot welding assembly 10 that can be used to resistance spot weld a workpiece stack-up 12 that includes a steel workpiece 14 and an aluminum workpiece 16 that are overlaid on each other. Although not shown in FIG. 1, the workpiece stack-up 12 could include additional workpieces, if desired, such as an additional aluminum workpiece (aluminum-aluminum-steel) or an additional steel workpiece (aluminum-steel-steel) so long as the two workpieces of the same base metal composition, i.e., aluminum or steel, are situated next to each other in the stack-up 12; that is, any additional aluminum workpiece is disposed adjacent to the aluminum workpiece 16 and any additional steel workpiece is disposed adjacent to the steel workpiece 14. As for the characteristics of the additional workpiece, the descriptions of the steel workpiece 14 and aluminum workpiece 16 set forth below are applicable to any additional steel or aluminum workpiece that may be included in the workpiece stack-up 12. It should be noted, however, that while the same general descriptions apply, there is no requirement that the two aluminum workpieces or the two steel workpieces of a three workpiece stack-up be identical in terms of composition, thickness, or form (e.g., wrought or cast). The steel and aluminum workpieces 14, 16 may be worked or deformed before or after being assembled into the workpiece stack-up 12, depending on the part being manufactured and the specifics of the overall manufacturing process for that particular part. The term "workpiece" and its steel and aluminum variations is used broadly in this description to refer to a rolled sheet metal layer, a casting, an extrusion, or any other piece that is resistance spot weldable.

The steel workpiece 14 includes a steel substrate that may be coated or uncoated (i.e., bare). The coated or uncoated steel substrate may be hot-rolled or cold-rolled and may be composed of any of a wide variety of steels including mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and press-hardened steel (PHS). And, if coated, the steel substrate preferably includes a surface layer of zinc, zinc-iron (galvanneal), a zinc-nickel alloy, nickel, aluminum, or an aluminum-silicon alloy. The term "steel workpiece" thus encompasses a wide variety of steel substrates, whether coated or uncoated, of different grades and strengths, and further includes those that have undergone pre-welding treatments like annealing, quenching, and/or tempering such as in the production of press-hardened steel. Furthermore, the steel workpiece 14 can have a thickness taken at its weld site that ranges between approximately 0.3 millimeters (mm) and 6.0 mm, between approximately 0.5 mm and 4.0 mm, and more narrowly between approximately 0.6 mm and 2.5 mm, although other thickness dimensions are possible.

The aluminum workpiece 16, on the other hand, includes an aluminum alloy substrate that may be coated or uncoated (i.e., bare). The aluminum substrate may be composed of elemental aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, or an aluminum-zinc alloy. If coated, the aluminum substrate preferably includes a surface layer of its natural refractory oxide layer(s), or, alternatively, it may include a surface layer of zinc, tin, or a metal oxide conversion coating comprised of oxides of titanium, zirconium, chromium, or silicon, as described in U.S. Patent Application Publication No. 2014/0360986. Furthermore, the aluminum workpiece 16 can have a thickness taken at its weld site that ranges from approximately 0.3 mm to 6.0 mm, from approximately 0.5 mm to 4.0 mm, and more narrowly from approximately 0.5 mm to 3.0 mm, although other thickness dimensions are possible.

The aluminum substrate of the aluminum workpiece 16 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include AA5754 aluminum-magnesium alloy, AA6022 aluminum-magnesium-silicon alloy, AA7003 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" thus encompasses elemental aluminum and a wide variety of aluminum alloy substrates, whether coated or uncoated, in different spot-weldable forms including wrought sheet layers, extrusions, forgings, etc., as well as castings, and further includes those that have undergone pre-welding treatments such as annealing, strain hardening, and solution heat treating.

Still referring to FIG. 1, the resistance spot welding assembly 10 is typically a part of a larger automated welding operation that includes a first welding gun arm 18 and a second welding gun arm 20 that are mechanically and electrically configured to repeatedly form resistance spot welds. In one example, the first and second welding gun arms 18, 20 are mounted on a robot positioned in the vicinity of a conveyor or other transport device that is set up to deliver the workpiece stack-up 12 to the accompanying welding gun. Different types of welding guns are suitable, including C-type and X-type welding guns, as well as other types. The first welding gun arm 18 can have a first electrode holder or shank 22 that secures a first welding electrode 24, and likewise the second welding gun arm 20 can have a second electrode holder or shank 26 that secures a second welding electrode 28. Additionally, as is known in the art, a mechanism for supplying the first and second welding electrodes 24, 28 with cooling water is typically incorporated into the first and second welding gun arms 18, 20 and into the first and second electrode holders 22, 26 in order to keep the welding electrodes 24, 28 from overheating during a resistance spot welding process.

Figure 6:
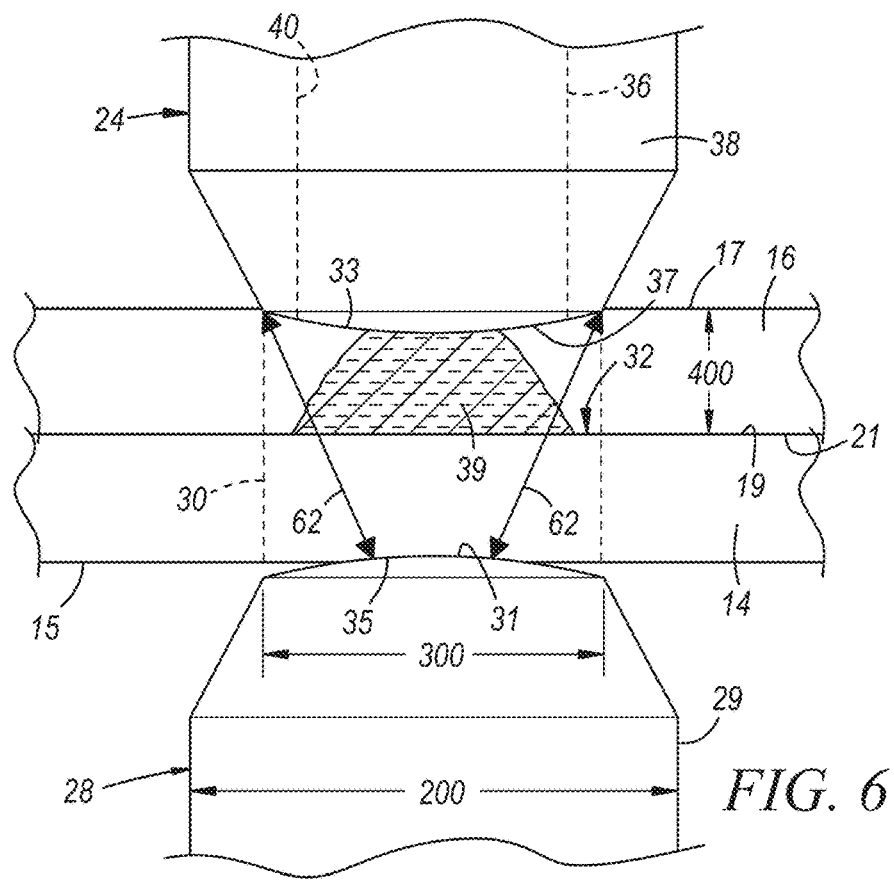
FIG. 6 depicts a part of an embodiment of a resistance spot welding process using the welding electrode with the insert of FIG. 4.

The first welding electrode 24 is described in more detail below. The second welding electrode 28 can be a conventional electrode composed of a suitable copper alloy material such as, for example, the copper-zirconium alloy that commonly goes by the designation C15000. Other copper alloy compositions, as well as other metal compositions not explicitly recited here, that possess suitable mechanical properties and suitable electrical and thermal conductivity properties may also be employed. The second welding electrode 28 can have any of a wide variety of designs. Generally, and referring now to FIG. 6, the second welding electrode 28 includes a body 29 and a weld face 31. The body 29 is preferably cylindrical in shape. A diameter 200 of the body 29 can range from approximately 12 mm to 22 mm, or more narrowly from approximately 16 mm to 20 mm. The weld face 31 constitutes the portion of the second welding electrode 28 that makes surface-to-surface contact with, and is impressed either partially or fully into, the steel workpiece 14. The weld face 31 has a diameter 300 that can range from approximately 3 mm to 16 mm, or more narrowly from approximately 4 mm to 8 mm. The weld face 31 has an outer surface that can have a dome shape as depicted in FIG. 6, or can be planar. If domed, the weld face 31 is preferably spherically-shaped with a radius of curvature from approximately 25 mm to 400 mm, or more narrowly from approximately 25 mm to 100 mm.

Referring back to FIG. 1, when engaged in resistance spot welding, the welding gun arms 18, 20 press their respective welding electrodes 24, 28 against opposite sides and outer surfaces 15, 17 of the overlaid workpieces 14, 16 at a weld site 30, with accompanying weld faces 37, 31 of the welding electrodes 24, 28 aligned across and with each other. An applied clamping force exerted at the weld site 30 can range between approximately 400 pounds (lb) and 2,000 lb, or more narrowly from approximately 600 lb to 1,300 lb. The clamping force can be sufficient to begin to impress the weld faces 37, 31 of the welding electrodes 24, 28 into the outer surfaces 15, 17 and establish a first contact patch 33 (FIG. 6) and a second contact patch 35 (FIG. 6). Referring to FIG. 6, once the welding electrodes 24, 28 are pressed against the outer surfaces 15, 17 at the weld site 30, a DC electrical current is passed through the workpiece stack-up 12 and between weld faces 37, 31, of the welding electrodes 24, 28.

In general, passage of the DC electrical current quickly generates heat within the more electrically and thermally resistive steel workpiece 14 and at a faying interface 32, resulting in the initiation and growth of a molten aluminum alloy weld pool 39 within the aluminum workpiece 16. The molten aluminum alloy weld pool 39 wets an adjacent inner surface 19 of the steel workpiece 14 and penetrates into the aluminum workpiece 16 from the faying interface 32. More specifically, the molten aluminum alloy weld pool 39 penetrates a distance that typically ranges from 20% to 100% (i.e., all the way through the aluminum workpiece 16) of a thickness 400 of the aluminum workpiece 16 as measured between an inner surface 21 of the aluminum workpiece 16 and the outer surface 17 of the aluminum workpiece 16 at the first contact patch 33.

Referring again to FIG. 1, the DC electrical current may be delivered for passage between the welding electrodes 24, 28 via a power supply 41 that is managed by a weld controller 43. The power supply 41 is preferably a medium-frequency direct controller (MFDC) inverter power supply that electrically communicates with the welding electrodes 24, 28, although other types of power supplies can be employed. The weld controller 43 manages the power supply 41 by directing the manner in which DC electrical current is exchanged between the welding electrodes 24, 28 based upon programmed instructions including a prescribed weld schedule. The programmed characteristics of the DC electrical current may command the DC electrical current to have a constant current level or be pulsed over time, or some combination of the two, and typically call for the current level to be maintained mostly between 5 kA and 50 kA from commencement to cessation and to last for a duration of 40 ms to 2,500 ms in order to grow the molten aluminum alloy weld pool 39 to its desired size.

The welding electrodes 24, 28 maintain their clamping force against the outer surface 15, 17 of the workpiece stack-up 12 until after passage of the DC electrical current has ceased. During the time the DC electrical current is being passed, the first and second contact patches 33, 35 grow disproportionately since the aluminum workpiece 16 softens to a greater extent than the steel workpiece 14 due to its relatively lower melting point. As such, the second contact patch 35 associated with the second welding electrode 28 grows very little, while the first contact patch 33 associated with the first welding electrode 24 grows considerably more as the weld face 37 of the first welding electrode 24 indents into the softened aluminum workpiece 16. For instance, after passage of the DC electrical current is ceased, the surface area of the first contact patch 33 formed into the outer surface 17 is typically greater than the surface area of the second contact patch 35 formed into the outer surface 15 by a ratio of 1.5:1 to 16:1, or more narrowly by a ratio of 1.5:1 to 5:1. This difference in contact patch sizes results in the DC electrical current assuming a conical flow pattern through the workpiece stack-up 12—with a greater current density present within the steel workpiece 14 than within the aluminum workpiece 16—that can help improve the integrity and peel strength of the final weld joint, as is detailed below.

Figure 7:
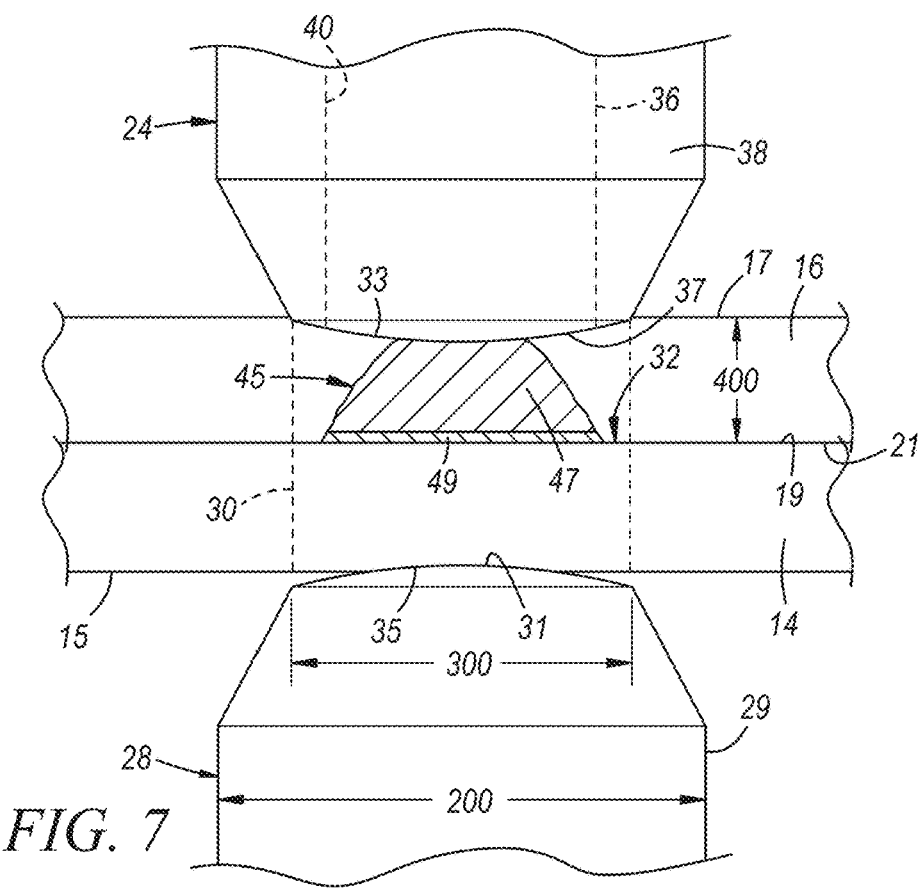
FIG. 7 is similar to FIG. 6, but depicts a solidified weld joint.

After passage of the DC electrical current between the weld faces 37, 31 ceases, the molten aluminum alloy weld pool 39 solidifies into a weld joint 45 that bonds the aluminum workpiece 16 and steel workpiece 14 together, as illustrated in FIG. 7. The weld joint 45 includes an aluminum alloy weld nugget 47 and, typically, one or more Fe—Al intermetallic layers 49. The aluminum alloy weld nugget 47 spans into the aluminum workpiece 16 to a distance that often ranges from about 20% to about 100% (i.e., full penetration) of the thickness 400 of the aluminum workpiece 16, as measured between the inner surface 21 of the aluminum workpiece 16 and the outer surface 17 of the aluminum workpiece 16 at the first contact patch 33. The Fe—Al intermetallic layer(s) 49 are situated between the aluminum alloy weld nugget 47 and the inner surface 19 of the steel workpiece 14. The Fe—Al intermetallic layer(s) 49 are generally formed as a result of a reaction between the molten aluminum alloy weld pool 39 and the steel workpiece 14 during current flow and for a short period of time after current flow when the steel workpiece 14 still has an elevated temperature. The Fe—Al intermetallic layer(s) 49 can include $FeAl_3$, $Fe_2Al_5$, and other compounds, and typically have a combined thickness (i.e., total thickness of all intermetallic layers) of about 1 μm to about 5 μm when measured in the same direction as the thickness 400.

The welding electrodes 24, 28 are eventually separated from their respective contact patches 33, 35 to free the workpiece stack-up 12. The workpiece stack-up 12 may now be re-located relative to the welding gun arms 18, 20 so that the welding electrodes 24, 28 are positioned in axial-facing alignment at another weld site where the spot welding method is repeated. Or, rather than being re-located, the workpiece stack-up 12 may be moved away from the welding gun arms 18, 20 to make room for another similar workpiece stack-up in need of resistance spot welding. Following separation of the welding electrodes 24, 28 from their respective workpieces 14, 16, the first contact patch 33 has a noticeably larger surface area than the second contact patch 35 since, during current flow, the weld face 37 of the first welding electrode 24 indents farther into the aluminum workpiece 16 compared to how much the weld face 31 of the second welding electrode 28 indents into the steel workpiece 14.

Referring to FIG. 6, the faying interface 32 is located between the steel and aluminum workpieces 14, 16 at confronting and abutting inner surfaces 19, 21 of the workpieces 14, 16. The term "faying interface" is used broadly in the present disclosure and is intended to encompass instances of direct and indirect contact between the inner surfaces 19, 21 of the workpieces 14, 16. The inner surfaces 19, 21 are in direct contact with each other when they physically abut and are not separated by a discrete intervening material layer. The inner surfaces 19, 21 are in indirect contact with each other when they are separated by a discrete intervening material layer—and thus do not experience the type of interfacial physical abutment found in direct contact—yet are in close enough proximity to each other that resistance spot welding can still be practiced. Indirect contact between the inner surfaces 19, 21 of the steel and aluminum workpieces 14, 16 typically results when an optional intermediate material layer (not shown) is applied between the inner surfaces 19, 21 before the workpieces 14, 16 are superimposed against each other during formation of the workpiece stack-up 12.

An intermediate material layer that may be present between the inner surfaces 19, 21 of the steel and aluminum workpieces 14, 16 is an uncured yet heat-curable structural adhesive. Such an intermediate material typically has a thickness of 0.1 mm to 2.0 mm, or more narrowly between 0.2 mm to 1.0 mm, which permits spot welding through the intermediate layer without much difficulty. A structural adhesive may be disposed between the inner surfaces 19, 21 of the steel and aluminum workpieces 14, 16 so that, following spot welding, the workpiece stack-up 12 can be heated in an ELPO-bake oven or other device to cure the adhesive and provide additional bonding between the workpieces 14, 16. A specific example of a suitable heat-curable structural adhesive is a heat-curable epoxy that may include filler particles, such as silica particles, to modify the viscosity or other mechanical properties of the adhesive when cured. A variety of heat-curable epoxies are commercially available including DOW Betamate 1486, Henkel 5089, and Uniseal 2343. Other types of materials may certainly constitute the intermediate material layer in lieu of a heat-curable structural adhesive.

Figure 2:
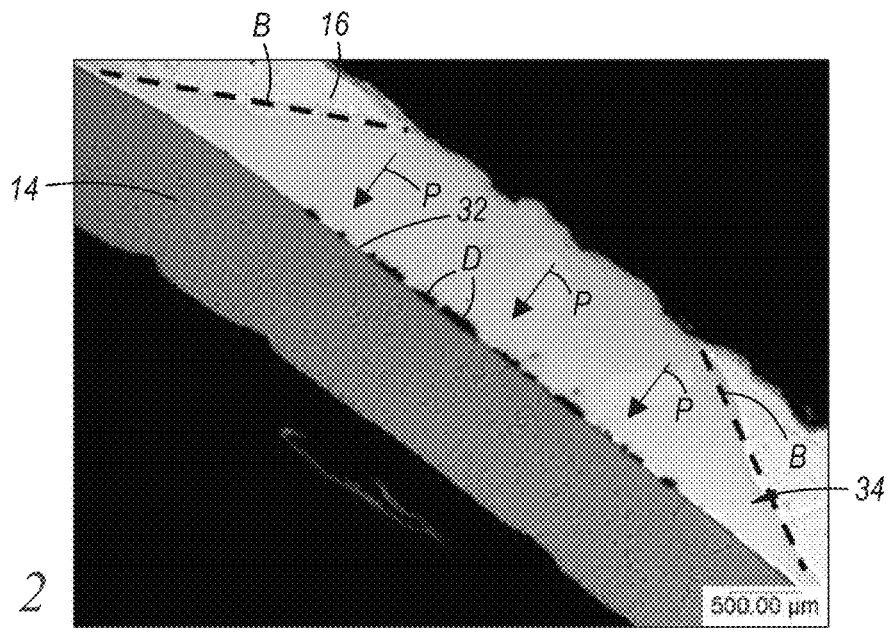
FIG. 2 is a photomicrograph of a representative weld joint formed between an aluminum alloy workpiece and steel workpiece by a resistance spot welding process without using an insert like the ones detailed in the present disclosure.

FIG. 2 illustrates a microstructure of an aluminum weld nugget 34 formed by a resistance spot welding process without the use of the first welding electrode 24 and its insert described below, but instead with the use of a pair of conventional copper alloy welding electrodes that passed 16 kiloamps (kA) of electrical current over 500 milliseconds (ms) of weld time. While a suitable weld nugget may be formed in some instances without using the first welding electrode 24 and its insert, in this example defects D have been discovered at, and disseminated along, the faying interface 32. Among other possibilities, the defects D may include shrinkage voids, gas porosity, oxide residue, and micro-cracking. When present and dispersed along the faying interface 32, it has been found that the defects D may reduce the peel strength of the weld joint established between the steel and aluminum workpieces 14, 16 and may negatively impact and weaken the overall integrity of the joint. Moreover, in addition to the defects D, one or more Fe—Al intermetallic layers (too small for visibility in the microstructure of FIG. 2), which are also considered to be part of the weld joint along with the aluminum weld nugget 34, may grow between the steel and aluminum workpieces 14, 16 and at the faying interface 32. The Fe—Al intermetallic layers can consist of $FeAl_3$ and $Fe_2Al_5$, as well as other compounds, and when present are often hard and brittle. Again, here, the Fe—Al intermetallic layers can have a negative impact on the overall integrity of the weld joint if allowed to grow extensively.

Without intending to be confined to particular theories of causation, it is currently believed that the accumulation and dissemination of the defects D along the faying interface 32 is due in large part to the solidification behavior of the molten aluminum weld pool as it transitions into the weld nugget 34. That is, a heat imbalance can develop between the much hotter steel workpiece 14 and cooler aluminum workpiece 16 because of the dissimilar physical properties of the two metals—namely, the much greater electrical and thermal resistivities of the steel. The steel therefore acts as a heat source while the aluminum acts as a heat conductor, creating a strong temperature gradient in the vertical direction that causes the molten aluminum weld pool to cool and solidify from its outer perimeter toward the faying interface 32 as heat from the molten aluminum weld pool is extracted directionally through the water-cooled welding electrode in contact with the aluminum workpiece 16. The path and direction of a solidification front is represented generally in FIG. 2 by arrows P, and a boundary of the weld nugget 34 is represented generally by broken lines B. The path P is pointed at the faying interface 32 and the more slanted boundary B (compared to that shown in FIG. 8) is the result of solidification toward the faying interface 32. Directed this way, weld pool defects D are drawn or swept towards the faying interface 32 as the solidification front progresses along path P, and end up situated at and along the faying interface 32. In addition, a surface oxide layer situated originally on the aluminum workpiece 16 becomes entrained within the weld nugget 34 and is not disrupted by the solidification front moving toward the faying interface 32; oxide layer fragments trapped near the faying interface 32 can be a further source of defects. Furthermore, it is currently believed that the growth of the Fe—Al intermetallic layers is due at least in part to the increased temperature experienced by the steel workpiece 14 during the resistance spot welding process.

Referring now to FIGS. 3-6, in order to limit and in some cases altogether preclude the accumulation and dissemination of the defects D at and along the faying interface 32, an insert 36 is employed and situated within a surrounding body 38 of the first welding electrode 24. The term "insert," as used herein, does not necessarily mean that the component it refers to has to be physically inserted into place during construction of the first welding electrode 24; rather, the component can be located in the first welding electrode 24 by insertion or by techniques other than insertion, some of which will be described below.

The insert 36 is composed of a refractory-based material that exhibits an electrical conductivity that is less than or equal to approximately 65% of the electrical conductivity of commercially pure annealed copper as defined by the International Annealed Copper Standard (IACS). The electrical conductivity of commercially pure annealed copper as defined by the IACS (also referred to as 100% IACS) is $5.8 \times 10^7$ S/m. The refractory-based material used to make the insert 36 includes at least 35 wt %, and preferably at least 50 wt %, of an elemental refractory metal. In one example, the insert 36 may be composed of an elemental refractory metal (100 wt % elemental refractory metal notwithstanding industry-accepted impurities) such as molybdenum metal or a tungsten metal. In another example, the insert 36 may be composed of a metal composite, such as a molybdenum metal composite or a tungsten metal composite, that includes greater than 35 wt % of its main refractory metal constituent. In one preferred example, the insert 36 is composed of a tungsten-copper metal composite that contains between 50 wt % and 90 wt % of a tungsten particulate phase dispersed in a copper matrix that makes up the remaining 50 wt % and 10 wt % of the composite. The surrounding body 38, on the other hand, can be composed of a similar material as the second welding electrode 28; that is, the body 38 can be composed of a copper alloy material having an electrical conductivity of 80% of the electrical conductivity of commercially pure annealed copper as defined by the IACS or greater, such as the copper zirconium alloy C15000. Accordingly, the material of the insert 36 has a lower electrical conductivity than that of the surrounding body 38, as well as a lower electrical conductivity than that of the second welding electrode 28; reciprocally, the material of the insert 36 hence has a higher electrical resistivity than that of the surrounding body 38 and than that of the second welding electrode 28.

Construction of the first welding electrode 24 with the insert 36 located almost wholly within the body 38, as shown in the figures, can be achieved in different ways and may be dictated by the materials of the insert 36 and the materials of the body 38. However constructed, the securement between the insert 36 and body 38 should be robust enough to endure an automated welding operation that is typical in automotive production applications, as well as other applications. In one example, the insert 36 and body 38 are secured together via an interference fit therebetween. The insert 36 is shaped and sized complementary to a bore 40 (FIG. 6) defined at an interior of the body 38. In this example the insert 36 has a cylindrical shape and the bore 40 forms a matching cylindrical cavity, still other shapes are suitable. The insert 36 is forcibly pressed through an open end of the bore 40 and into the bore 40 until surfaces 42, 44 (FIG. 3) of the insert 36 and bore 40 come into abutment and farther insertion is halted. In another example, the insert 36 and body 38 can be secured together via a threaded engagement with mating male and female threads. And in yet another example, the first welding electrode 24 can be constructed to have the insert 36 and surrounding body 38 via a co-extrusion process in which the material of the body 38 is extruded around the material of the insert 36. Still, other ways of constructing the first welding electrode 24 are possible.

Figure 3:
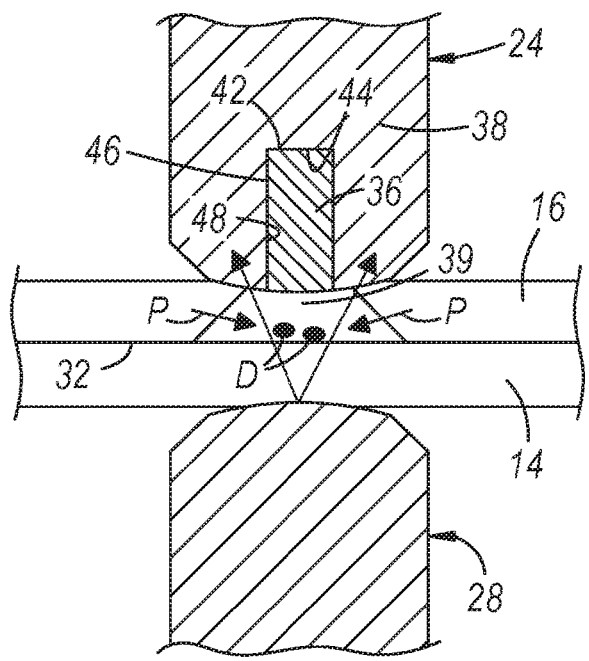
FIG. 3 is a side view of a pair of welding electrodes brought over a workpiece stack-up with one of the welding electrodes having an embodiment of an insert, the welding electrodes and insert depicted in sectional profile for demonstrative purposes.
Figure 9:
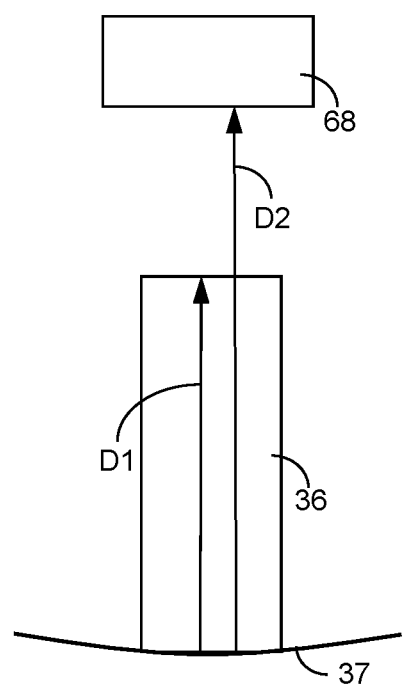
FIG. 9 is a schematic illustration of the axial depth of the insert of a welding electrode relative to the axial depth of the electrode, as measured between the weld face of the electrode and a cooling pocket, according to various embodiments as it relates to a cooling pocket of the welding electrode.

The insert 36 is positioned at a central region of the body 38 and hence constitutes a central portion of the first welding electrode 24; or the insert 36 may be positioned off-center within the body 38. Once in place, in the embodiments presented in the figures, surface-to-surface abutment and contact exists between exterior surfaces of the insert 36 and interior surfaces of the bore 40. Referring to FIG. 3, this includes surface-to-surface contact between surfaces 42, 44, and surface-to-surface contact between a cylindrical exterior side surface 46 of the insert 36 and a cylindrical interior side surface 48 of the bore 40. These surface-to-surface contacts may lack any appreciable gaps and spaces therebetween, and may lack any intermediate and intervening structure or material therebetween. Moreover, and as shown schematically in FIG. 9, the insert 36 can have an axial depth D1 within the body 38 (i.e., vertically-upward direction in FIG. 3) that spans to, and comes into abutment and communication with, a cooling mechanism or cooling pocket 68 equipped in the first welding electrode 24. The axial depth D1 of the insert 36 need not span to a cooling mechanism/pocket 68, however, while still constituting a not insubstantial proportion of an axial depth D2 of the first welding electrode 24 measured between the weld face 37 and the cooling mechanism/pocket 68. Indeed, as a preference in some examples, a portion of the body 38 can separate the insert 36 from direct abutment and communication with any cooling mechanism/pocket 68, thereby serving as a barrier therebetween; exposing the insert 36 to the weld water environment associated with the cooling mechanism/pocket 68 could result in unwanted galvanic corrosion, such as between the body 38 and insert 36. In an example, the axial depth D1 of the insert 36 can take up a majority of the axial depth D2 of the first welding electrode 24 measured between the weld face 37 and the cooling mechanism/pocket 68, and can constitute approximately 51% to 80% of the axial depth D2 of the first welding electrode 24 measured between the weld face 37 and the cooling mechanism/pocket 68. In one example, the axial depth D1 of the insert 36 is approximately 10 mm; of course, other values for the axial depth are possible. The axial depth D1 of the insert 36 has been found to contribute to beneficially influencing solidification behavior of a resulting molten aluminum weld pool, as set forth in greater detail below. The axial depth of the insert 36 is also denoted in FIG. 5 by reference numeral 900.

Figure 5:
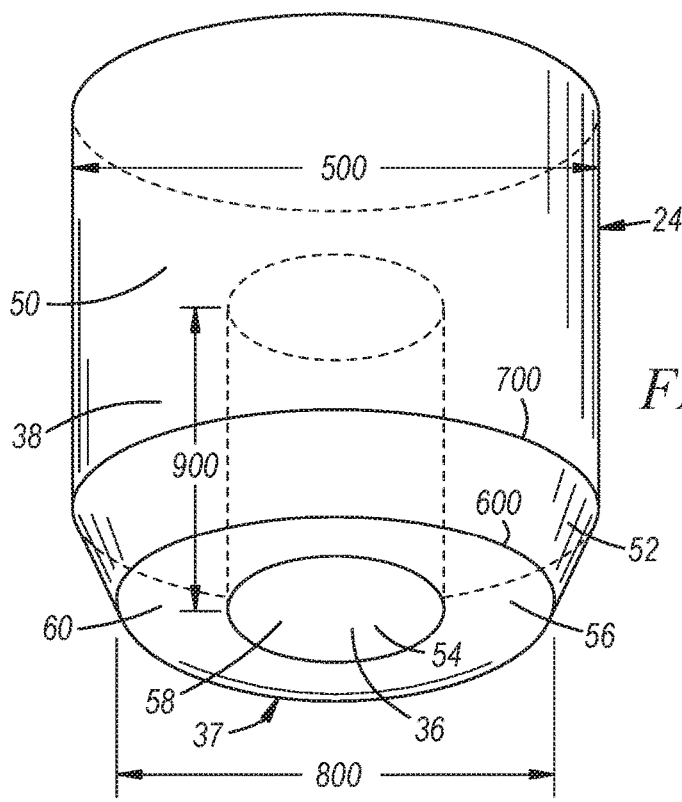
FIG. 5 is a perspective view of the welding electrode with the insert of FIG. 4.

Referring particularly to FIG. 5, a body portion 50 of the first welding electrode 24 is cylindrical in shape and can have an accessible recess (not shown) at a rear end for coupling to the first electrode shank 22. A diameter 500 of the body portion 50 can range from approximately 12 mm to 22 mm, or more narrowly from approximately 16 mm to 20 mm. The weld face 37 of the first welding electrode 24 constitutes the portion of the first welding electrode 24 that makes surface-to-surface contact with, and is impressed either partially or fully upon, the aluminum workpiece 16. The weld face 37 resides at a front end of the first welding electrode 24 and has a circumference 600 that is coincident with a circumference 700 of the body portion 50 (termed a "full face electrode") or is vertically displaced from the circumference 700 by a transition nose 52. If the transition nose 52 is indeed present, the circumferences 600, 700 may be parallel as depicted in the figures or may be offset from each other whereby the circumference 600 is tilted relative to the circumference 700. The weld face 37 can have a dome shape ascending from the circumference 600. The weld face 37 has a diameter 800 measured at its circumference 600 that can range from approximately 6 mm to 20 mm, or more narrowly from approximately 8 mm to 12 mm. The dome shape of the weld face 37 can be spherically-shaped with a radius of curvature that can range from approximately 15 mm to 300 mm, or more narrowly from approximately 20 mm to 150 mm, or even more narrowly from approximately 20 mm to 50 mm. Additionally, and although not shown in the figures, the weld face 37 may have surface features intended to penetrate any oxide layer(s) formed on the outer surface 17 of the aluminum workpiece 16. For instance, if desired, the weld face 37 can be textured, roughened, or have a set of protruding rings. Examples of these kinds of surface features are described in U.S. Pat. Nos. 6,861,609; 8,222,560; 8,274,010; 8,436,269; 8,525,066; and 8,927,894.

Still referring to FIG. 5, the insert 36 is situated within the body 38 such that an exposed surface 54 of the insert 36 constitutes a section of the weld face 37 that comes into surface-to-surface contact with the aluminum workpiece 16. A remaining section of the weld face 37 is made up by a surface 56 of the body 38. In this way, the weld face 37 is composed of a first section 58 defined by the exposed surface 54 of the insert 36, and a second section 60 defined by the surface 56 of the body 38. The first section 58 is circular in shape and presents the material of the insert 36 for contact with the aluminum workpiece 16 during resistance spot welding. The second section 60, on the other hand, is annular in shape and presents the material of the body 38 for contact with the aluminum workpiece 16 during resistance spot welding. In the embodiment of FIG. 3, the insert 36 has a reduced diameter compared to that of the insert 36 of FIG. 4, and hence the insert 36 of FIG. 3 has a comparatively smaller first section 58 and a larger second section 60. These differences in size of the insert 36 in FIGS. 3 and 4 can influence solidification behavior of a resulting molten aluminum weld pool, as set forth in greater detail below.

As depicted in the embodiment of FIG. 5, the first section 58 resides at a central region of the weld face 37, though need not and can reside off-center at the weld face 37. The second section 60 encircles the first section 58 and hence resides at a peripheral region of the weld face 37. The full surface area of the weld face 37 is thus bifurcated into the surface area of the first section 58 and the surface area of the second section 60. As an apportionment of the full surface area, the first section 58 can occupy between approximately 5% and 60% of the total surface area of the weld face 37, while the second section 60 can in turn occupy between approximately 95% and 40% of the total surface area of the weld face 37. In terms of dimensions, the first section 58 can have a total surface area that ranges between approximately 7 mm$^2$ and 64 mm$^2$, and the second section 60 can have a total surface area that ranges between approximately 50 mm$^2$ and 106 mm$^2$. Still, other examples could have other occupied percentages and could have other surface area dimensions.

As described, the use of the first welding electrode 24 with the insert 36 works to preclude the accumulation and dissemination of the defects D along the faying interface 32 by altering the solidification behavior of the molten aluminum alloy weld pool 39. First, because of its relatively low electrical conductivity, the insert 36 generates heat amid resistance spot welding. The heat can be generated within the insert 36 as current flows through it (resistive heating), and the insert 36 can be heated by heat conduction from the molten aluminum alloy weld pool 39. The heat within the insert 36 can be greater than the heat at the surrounding body 38 due to the insert 36 having a lower electrical conductivity than that of the surrounding body 38. Further, the heat within the insert 36 cannot be transferred readily to the surrounding body 38 on account of the insert 36 exhibiting a relatively low thermal conductivity (compared to a conventional CuZr welding electrode). The insert 36 therefore retains heat within the aluminum workpiece 16 underneath and in contact with the insert 36 and the exposed surface 54. The retained heat would not otherwise occur absent the insert 36. The heat within the aluminum workpiece 16 underneath and in contact with the insert 36 is retained for a longer period of time than heat within the aluminum workpiece 16 underneath and in contact with the surrounding body 38. The retained heat changes the temperature distribution within the weld site 30 by creating three-dimensional radial temperature gradients around the molten aluminum alloy weld pool 39 or enlarging already-existing three-dimensional radial temperature gradients. These temperature gradients slow directional heat flow from the molten aluminum alloy weld pool 39 into the first welding electrode 24, and help promote lateral heat transfer and dissemination within the steel and aluminum workpieces 14, 16. The resulting heat distribution alters the cooling action of the molten aluminum alloy weld pool 39 as it solidifies into the weld joint 45.

Second, amid current flow, the DC electrical current exchanged between the first and second welding electrodes 24, 28 assumes a conical flow pattern within the steel and aluminum workpieces 14, 16 and around the insert 36 at the first welding electrode 24 (the conical flow pattern is schematically and generally represented in FIG. 6 by the arrowed lines denoted by numerals 62). Since the material of the surrounding body 38 exhibits a lower electrical resistivity than the material of the insert 36, the passing electrical current has a natural tendency to flow through the annular second section 60 defined by the material of the body 38. This means that a larger amount of electrical current flow in the first welding electrode 24 is exchanged via the body 38 than via insert 36. The conical flow pattern 62 results, in part, from the surface area of the first contact patch 33 at the aluminum workpiece 16 being greater in size than the surface area of the second contact patch 35 at the steel workpiece 14, as set forth above. As depicted by the arrowed lines 62, the path of passing electrical current expands radially from the weld face 31 of the second welding electrode 28 toward the weld face 37 of the first welding electrode 24 such that the electrical current density is greater in the steel workpiece 14 than in the aluminum workpiece 16. The difference in current density concentrates heat within a smaller zone inside of the steel workpiece 14 as compared to the aluminum workpiece 16. The concentrated heat creates three-dimensional radial temperature gradients around the molten aluminum alloy weld pool 39, or enlarges already-existing three dimensional radial temperature gradients therearound, and thus helps promote lateral heat transfer and dissemination from the molten aluminum alloy weld pool 39 into the steel and aluminum workpieces 14, 16.

Figure 8:
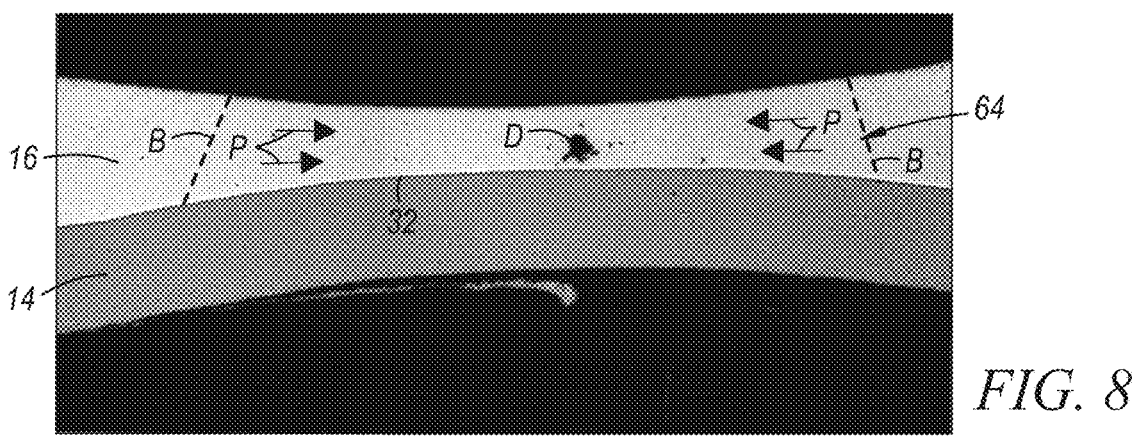
FIG. 8 is a photomicrograph of an expected weld joint formed between an aluminum alloy workpiece and steel workpiece by a resistance spot welding process using an embodiment of an insert like the ones detailed in the present disclosure.

As described, the generated and retained and concentrated heat serves to change the temperature distribution in the weld site 30 by creating three-dimensional radial temperature gradients around the molten aluminum alloy weld pool 39 or enlarging already-existing three dimensional radial temperature gradients therearound. These temperature gradients slow directional heat flow into the first welding electrode 24 and help promote lateral heat transfer and dissemination. The resultant improved heat balance and more even heat distribution changes the cooling action of the molten aluminum alloy weld pool 39 as it solidifies to become the aluminum alloy weld nugget 47. FIG. 8 illustrates a microstructure of an expected aluminum weld nugget 64 formed by a resistance spot welding process using the first welding electrode 24 with the insert 36 and using the second welding electrode 28. Instead of the solidification front progressing toward the faying interface 32 as is demonstrated in FIG. 2 and described above, the effects of the insert 36 cause the molten aluminum alloy weld pool 39 to cool and solidify inward from its outer perimeter toward a central region. The path and direction of the solidification front is represented generally in FIG. 8 by arrows P, and a boundary of the aluminum weld nugget 64 is represented by broken lines B. The path P is pointed toward the central region of the aluminum weld nugget 64 as a result of the altered solidification path which, consequently, draws or sweeps weld pool defects D towards the center of the aluminum weld nugget 64 where they conglomerate and settle (as opposed to broadly disperse) at the faying interface 32, or offset from the faying interface 32 as shown in FIG. 8. The boundary B is directed more orthogonal relative to the faying interface 32 than the boundary demonstrated in FIG. 2—this too is a result of the altered temperature gradients and resulting solidification path.

Figure 4:
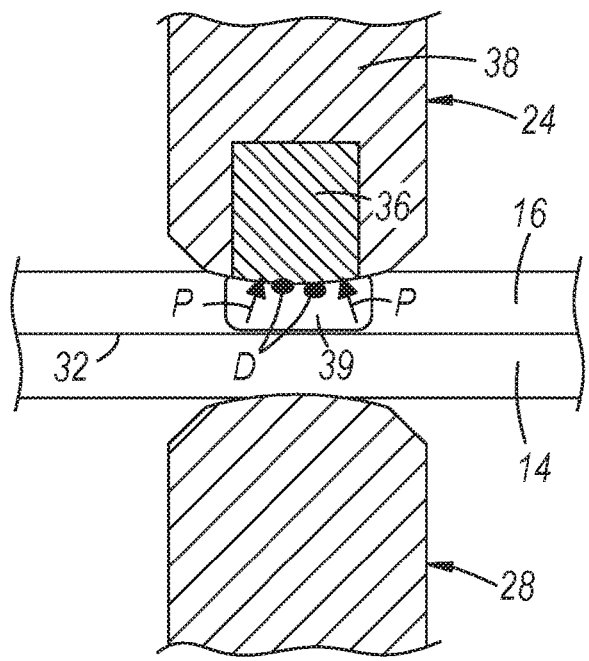
FIG. 4 is a side view of a pair of welding electrodes brought over a workpiece stack-up with one of the welding electrodes having another embodiment of an insert, the welding electrodes and insert depicted in sectional profile for demonstrative purposes.

Still further, the different-sized inserts 36 of FIGS. 3 and 4 can have a nuanced effect on cooling and solidification of the molten aluminum alloy weld pool 39, while still precluding the accumulation and dissemination of the defects D at and along the faying interface 32 as previously seen in FIG. 2. In FIG. 3, the reduced-diameter insert 36 causes a more radially-directed cooling and solidification which draws and sweeps the defects D more toward the center of the resulting aluminum weld nugget where they can conglomerate and settle more near the faying interface 32—it is currently believed that this is due to the reduced amount of heat generated and retained compared to the insert 36 of FIG. 4. In FIG. 4, on the other hand, the increased-diameter insert 36 causes a more axially-directed cooling and solidification which draws and sweeps the defects D more vertically toward (as shown in FIG. 4) the insert 36 and away from the faying interface 32—it is currently believed that this is due to the increased amount of heat generated and retained compared to the insert 36 of FIG. 3. The solidification behavior of the molten aluminum alloy weld pool 39 just described and depicted in FIGS. 3, 4, and 8, moreover, can be augmented by keeping the weld face 37 and first section 58 in pressed contact with the outer surface 17 of the aluminum workpiece 16 after cessation of the DC electrical current and while the weld face 37 still retains heat.

The ability to generate, retain, and concentrate heat can also reduce the amount of heat that needs to be generated in the steel workpiece 14 by the DC electrical current in order to initiate and grow the molten aluminum alloy weld pool 39. The magnitude and/or duration of the DC electrical current can thus be reduced to try and limit the thickness of any Fe—Al intermetallic layers that may form within the weld joint 45 and at the faying interface 32. As a result of all this, the weld joint 45 is likely to demonstrate good overall strength and durability, including adequate peel strength when subjected to standard peel strength testing.

Lastly, the first welding electrode 24 and insert 36 present yet another working advantage that stems from the relatively high melting temperature of the refractory-based material of the insert 36. Specifically, the first section 58 of the weld face 37 is quite inert to the aluminum alloy compositions found within the aluminum workpiece 16, even over the course of many rapid resistance spot welding events at temperatures that approach the melting point of the aluminum workpiece 16. The first section 58, for instance, does not metallurgically react readily with aluminum alloys to form intermetallic, oxide, and/or other contaminants that have a tendency to spall or form pits in the weld face 37 if produced and not removed. The first welding electrode 24 can therefore endure more resistance spot welding events between redressing operations than, for instance, a conventional copper-zirconium welding electrode, which can help maximize and extend the operational lifetime of the first welding electrode 24 compared to other more conventional copper alloy welding electrodes.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a steel workpiece and an aluminum or aluminum alloy workpiece, the method comprising:
    providing a workpiece stack-up that includes a steel workpiece and an aluminum or aluminum alloy workpiece;
    contacting the aluminum or aluminum alloy workpiece with a first weld face of a first welding electrode, the first welding electrode having a body and an insert located within and surrounded by the body, the first weld face residing at one end of the body and further having a dome shape that ascends from a circumference of the first weld face, wherein the insert has an exposed surface that constitutes a first section of the first weld face and the body has a surface that surrounds the exposed surface of the insert and constitutes a second section of the first weld face, each of the first section of the first weld face and the second section of the first weld face making surface-to-surface contact with the aluminum or aluminum alloy workpiece, and wherein the body is composed of a first material and the insert is composed of a second material, the second material having an electrical resistivity that is greater than an electrical resistivity of the first material;
    contacting the steel workpiece with a second weld face of a second welding electrode; and
    passing a DC electrical current between the first welding electrode and the second welding electrode, the DC electrical current assuming a conical flow pattern that expands radially from the second weld face of the second welding electrode toward the first weld face of the first welding electrode and wherein more current flows between the second weld face of the second welding electrode and the second section of the first weld face of the first welding electrode than between the second weld face of the second welding electrode and the first section of the first weld face of the first welding electrode.

2. The method as set forth in claim 1, wherein the second material of the insert is a refractory-based material having an electrical conductivity that is less than or equal to 65% of the electrical conductivity of commercially pure annealed copper as defined by the International Annealed Copper Standard (IACS).

3. The method as set forth in claim 1, wherein the second material of the insert includes at least 35 wt % of an elemental refractory metal.

4. The method as set forth in claim 1, wherein the second material is a molybdenum metal, a molybdenum metal composite, a tungsten metal, or a tungsten metal composite.

5. The method as set forth in claim 1, wherein the insert has an axial depth that constitutes a majority of an axial depth of the first welding electrode taken between the first weld face and a cooling pocket of the first welding electrode.

6. The method as set forth in claim 1, wherein the insert has an axial depth that constitutes 50% to 80% of an axial depth of the first welding electrode taken between the first weld face and a cooling pocket of the first welding electrode.

7. The method as set forth in claim 1, wherein the first section of the first weld face occupies 5% to 60% of a total surface area of the first weld face.

8. The method as set forth in claim 1, wherein passing the DC electrical current between the first welding electrode and the second welding electrode heats the insert more than the body of the first welding electrode.

9. The method as set forth in claim 8, wherein heat is retained in a portion of the aluminum or aluminum alloy workpiece underneath and in contact with the exposed surface of the insert for a longer period of time than within a portion of the aluminum or aluminum alloy workpiece underneath and in contact with the surface of the body the constitutes the second section of the first weld face.

10. The method as set forth in claim 1, wherein the second welding electrode is composed of a copper alloy.

11. The method as set forth in claim 1, further comprising:
    ceasing passage of the DC electrical current between the first welding electrode and the second welding electrode; and
    separating the first weld face of the first welding electrode from the aluminum or aluminum alloy workpiece and separating the second weld face of the second welding electrode from the steel workpiece.

12. The method as set forth in claim 1, wherein passing the DC electrical current between the first welding electrode and the second welding electrode results in a molten aluminum or aluminum alloy weld pool being formed within the aluminum or aluminum alloy workpiece, respectively, the molten aluminum or aluminum alloy weld pool wetting an adjacent surface of the steel workpiece.

13. The method as set forth in claim 1, wherein the first section of the first weld face occupies 5% to 60% of a total surface area of the first weld face, and wherein the second section of the first weld face occupies 95% and 40% of the total surface area of the first weld face.

14. A method of resistance spot welding a steel workpiece and an aluminum or aluminum alloy workpiece, the method comprising:
    providing a workpiece stack-up that includes a steel workpiece and an aluminum or aluminum alloy workpiece;
    contacting the aluminum or aluminum alloy workpiece with a first weld face of a first welding electrode, the first welding electrode having a body and an insert located within and surrounded by the body, the first weld face residing at one end of the body and further having a dome shape that ascends from a circumference of the first weld face, wherein the insert has an exposed surface that constitutes a first section of the first weld face and the body has a surface that surrounds the exposed surface of the insert and constitutes a second section of the first weld face, each of the first section of the first weld face and the second section of the first weld face making surface-to-surface contact with the aluminum or aluminum alloy workpiece, and wherein the body is composed of a first material and the insert is composed of a second material, the second material having an electrical resistivity that is greater than an electrical resistivity of the first material;

contacting the steel workpiece with a second weld face of a second welding electrode; and passing a DC electrical current between the first welding electrode and the second welding electrode, the DC electrical current assuming a conical flow pattern that expands radially from the second weld face of the second welding electrode toward the first weld face of the first welding electrode and wherein more current flows between the second weld face of the second welding electrode and the second section of the first weld face of the first welding electrode than between the second weld face of the second welding electrode and the first section of the first weld face of the first welding electrode, and wherein passing the DC electrical current between the first welding electrode and the second welding electrode results in a molten aluminum or aluminum alloy weld pool being formed within the aluminum or aluminum alloy workpiece, respectively, the molten aluminum or aluminum alloy weld pool wetting an adjacent surface of the steel workpiece; and ceasing passage of the DC electrical current between the first welding electrode and the second welding electrode to allow the molten aluminum or aluminum alloy weld pool to solidify into a weld joint that bonds the aluminum or aluminum alloy workpiece to the steel workpiece.

15. The method as set forth in claim 14, wherein passing the DC electrical current between the first welding electrode and the second welding electrode heats the insert more than the body of the first welding electrode.

16. The method as set forth in claim 15, wherein heat is retained in a portion of the aluminum or aluminum alloy workpiece underneath and in contact with the exposed surface of the insert for a longer period of time than within a portion of the aluminum or aluminum alloy workpiece underneath and in contact with the surface of the body the constitutes the second section of the first weld face.

17. The method as set forth in claim 14, wherein the second welding electrode is composed of a copper alloy.

* * * * *